(12) United States Patent
Macias

(10) Patent No.: US 6,167,799 B1
(45) Date of Patent: Jan. 2, 2001

(54) TAMALE AND VEGETABLE STEAMING DEVICE

(76) Inventor: Mary A. Macias, 7000 La Palma Ave., #B106, Buena Park, CA (US) 90620

( * ) Notice: Under 35 U.S.C. 154(b), the term of this patent shall be extended for 0 days.

(21) Appl. No.: 09/591,129

(22) Filed: Jun. 10, 2000

(51) Int. Cl.[7] .............................. A47J 27/00; A47J 27/04; A47J 27/10; A47J 37/06; A47J 36/22
(52) U.S. Cl. ........................... 99/413; 99/403; 99/410; 99/415; 99/417; 99/418
(58) Field of Search ................ 99/339, 340, 403–418, 99/449, 450, 444–446; 126/373, 376, 369, 377, 350, 20; 210/465–469, 244–246, 475, 477; 220/912, 428; 219/401, 521; 426/510, 511, 523

(56) References Cited

U.S. PATENT DOCUMENTS

| Re. 16,011 | * | 3/1925 | Simon | 99/412 |
|---|---|---|---|---|
| 899,244 | * | 9/1908 | Chase | 99/412 |
| 1,214,992 | * | 2/1917 | Boleratz | 99/412 |
| 2,081,751 | * | 5/1937 | Lendrum et al. | 99/412 |
| 3,808,963 | * | 5/1974 | Ludena | 99/417 |
| 4,164,174 | * | 8/1979 | Wallsten | 99/415 |
| 4,317,017 | | 2/1982 | Bowen | 219/10.55 E |
| 4,401,017 | * | 8/1983 | Feld | 99/413 |
| 4,462,308 | * | 7/1984 | Wang | 126/369 X |
| 4,604,989 | * | 8/1986 | Kita | 126/377 X |
| 4,739,698 | * | 4/1988 | Allaire | 99/417 |
| 5,097,753 | | 3/1992 | Naft | 99/341 |
| 5,195,424 | | 3/1993 | Guajaca | 99/418 |
| 5,287,798 | * | 2/1994 | Tkaeda | 99/413 |
| 5,584,235 | * | 12/1996 | DuBois et al. | 126/369 X |
| 5,816,139 | * | 10/1998 | Paci | 99/410 X |

* cited by examiner

Primary Examiner—Timothy F. Simone
(74) Attorney, Agent, or Firm—Goldstein & Canino

(57) ABSTRACT

The tamale and vegetable steaming device including a cylindrical pot portion having an open upper end and a closed lower end. A cylindrical insert is positionable within the cylindrical pot portion. The cylindrical insert has an open upper end, a closed lower end, and a cylindrical side wall therebetween. The cylindrical side wall has a plurality of apertures therethrough in a spaced relationship. The insert being positionable within the pot portion whereby the closed lower end of the insert is elevated above the closed lower end of the pot portion. The insert has a flattened arc portion extending a height thereof. The flattened arc portion creates a separation between the insert and the pot portion whereby water can be added to the pot portion through the separation.

10 Claims, 3 Drawing Sheets

TAMALE AND VEGETABLE STEAMING DEVICE

BACKGROUND OF THE INVENTION

The present invention relates to a tamale and vegetable steaming device and more particularly pertains to allowing tamales and vegetables to be steamed while easily monitoring water levels to prevent burning.

The use of steaming devices is known in the prior art. More specifically, steaming devices heretofore devised and utilized for the purpose of steaming foods are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,317,017 to Bowen discloses a steamer comprised of a transparent dish in the bottom for holding water; however, the invention is primarily intended for microwave cooking. U.S. Pat. No. 5,195,424 to Guajaca discloses a steamer comprised of horizontally stacked racks adapted for steaming tamales. U.S. Pat. No. 5,097,753 to Naft discloses a steam cooking device with a liquid reservoir in the base.

While these devices fulfill their respective, particular objective and requirements, the aforementioned patents do not describe a tamale and vegetable steaming device for allowing tamales and vegetables to be steamed while easily monitoring water levels to prevent burning.

In this respect, the tamale and vegetable steaming device according to the present invention substantially departs from the conventional concepts and designs of the prior art, and in doing so provides an apparatus primarily developed for the purpose of allowing tamales and vegetables to be steamed while easily monitoring water levels to prevent burning.

Therefore, it can be appreciated that there exists a continuing need for a new and improved tamale and vegetable steaming device which can be used for allowing tamales and vegetables to be steamed while easily monitoring water levels. In this regard, the present invention substantially fulfills this need.

SUMMARY OF THE INVENTION

In the view of the foregoing disadvantages inherent in the known types of steaming devices now present in the prior art, the present invention provides an improved tamale and vegetable steaming device. As such, the general purpose of the present invention, which will be described subsequently in greater detail, is to provide a new and improved tamale and vegetable steaming device which has all the advantages of the prior art and none of the disadvantages.

To attain this, the present invention essentially comprises a cylindrical pot portion having an open upper end and a closed lower end. The cylindrical pot portion is fabricated of a transparent material. The pot portion has a pair of diametrically opposed handles extending outwardly therefrom downwardly of the open upper end. The pot portion has an annular line extending therearound upwardly of the closed lower end. The open upper end has an annular lip extending outwardly therefrom. The pot portion includes a cover portion dimensioned for positioning over the open upper end. The cover portion has a handle secured thereto. A cylindrical insert is positionable within the cylindrical pot portion. The cylindrical insert has an open upper end, a closed lower end, and a cylindrical side wall therebetween. The cylindrical side wall has a plurality of apertures therethrough in a spaced relationship. The open upper end has an annular lip extending outwardly therefrom. The annular lip rests on the annular lip of the pot portion whereby the closed lower end of the insert is elevated above the closed lower end of the pot portion. The insert has a flattened arc portion extending a height thereof. The flattened arc portion creates a separation between the insert and the pot portion whereby water can be added to the pot portion through the separation. The flattened arc portion has a handle extending outwardly thereof adjacent to the open upper end of the insert.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tamale and vegetable steaming device which has all the advantages of the prior art steaming devices and none of the disadvantages.

It is another object of the present invention to provide a new and improved tamale and vegetable steaming device which may be easily and efficiently manufactured and marketed.

It is a further object of the present invention to provide a new and improved tamale and vegetable steaming device which is of durable and reliable construction.

An even further object of the present invention is to provide a new and improved tamale and vegetable steaming device which is susceptible of a low cost of manufacture with regard to both materials and labor, and which accordingly is then susceptible of low prices of sale to the consuming public, thereby making such a tamale and vegetable steaming device economically available to the buying public.

Even still another object of the present invention is to provide a new and improved tamale and vegetable steaming device for allowing tamales and vegetables to be steamed while easily monitoring water levels.

Lastly, it is an object of the present invention to provide a new and improved tamale and vegetable steaming device including a cylindrical pot portion having an open upper end and a closed lower end. A cylindrical insert is positionable within the cylindrical pot portion. The cylindrical insert has an open upper end, a closed lower end, and a cylindrical side wall therebetween. The cylindrical side wall has a plurality of apertures therethrough in a spaced relationship. The insert being positioned within the pot portion whereby the closed lower end of the insert is elevated above the closed lower end of the pot portion. The insert has a flattened arc portion extending a height thereof. The flattened arc portion creates a separation between the insert and the pot portion whereby water can be added to the pot portion through the separation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
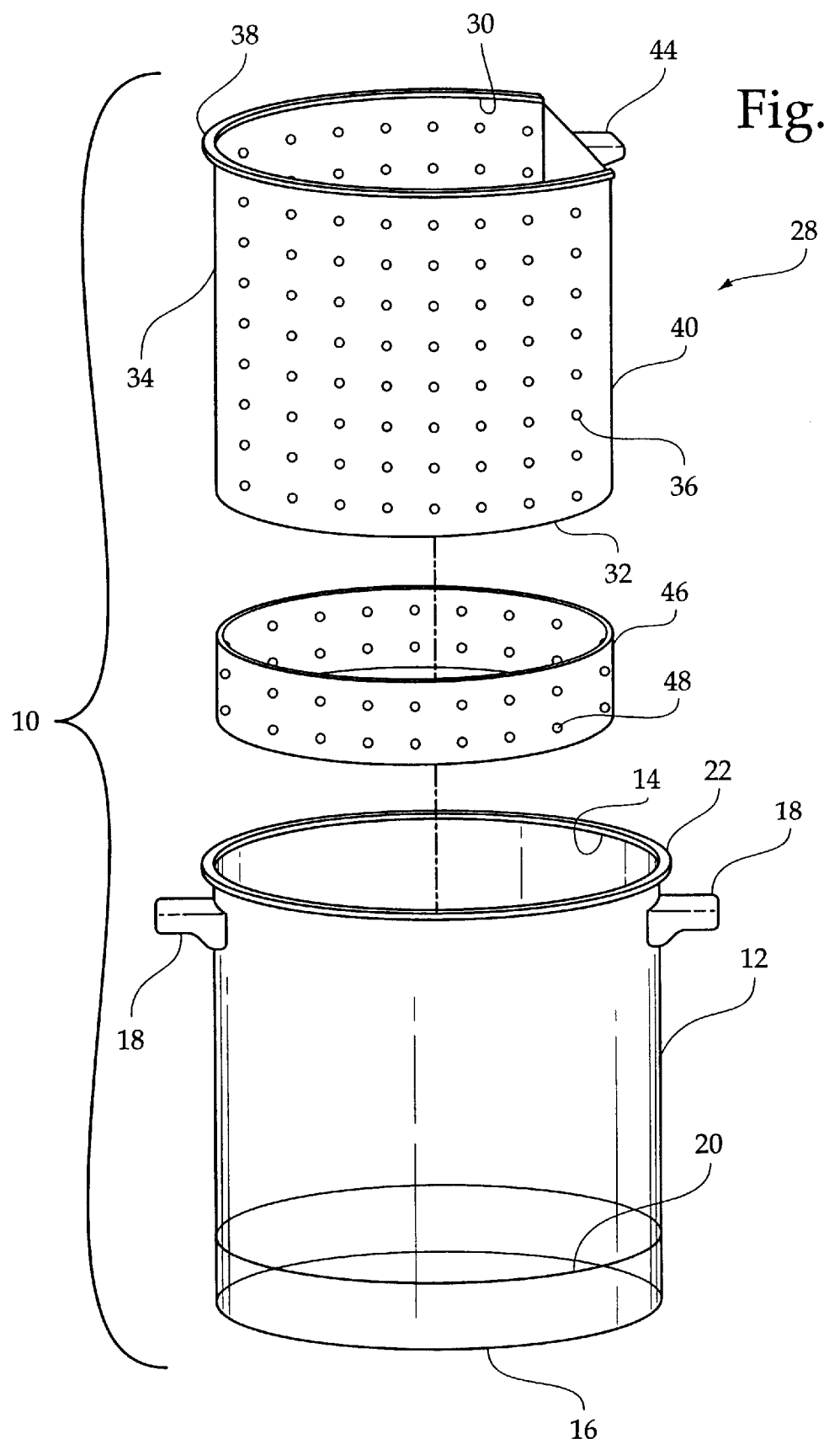
FIG. 1 is an exploded perspective view of the preferred embodiment of the tamale and vegetable steaming device to constructed in accordance with the principles of the present invention.
Figure 2:
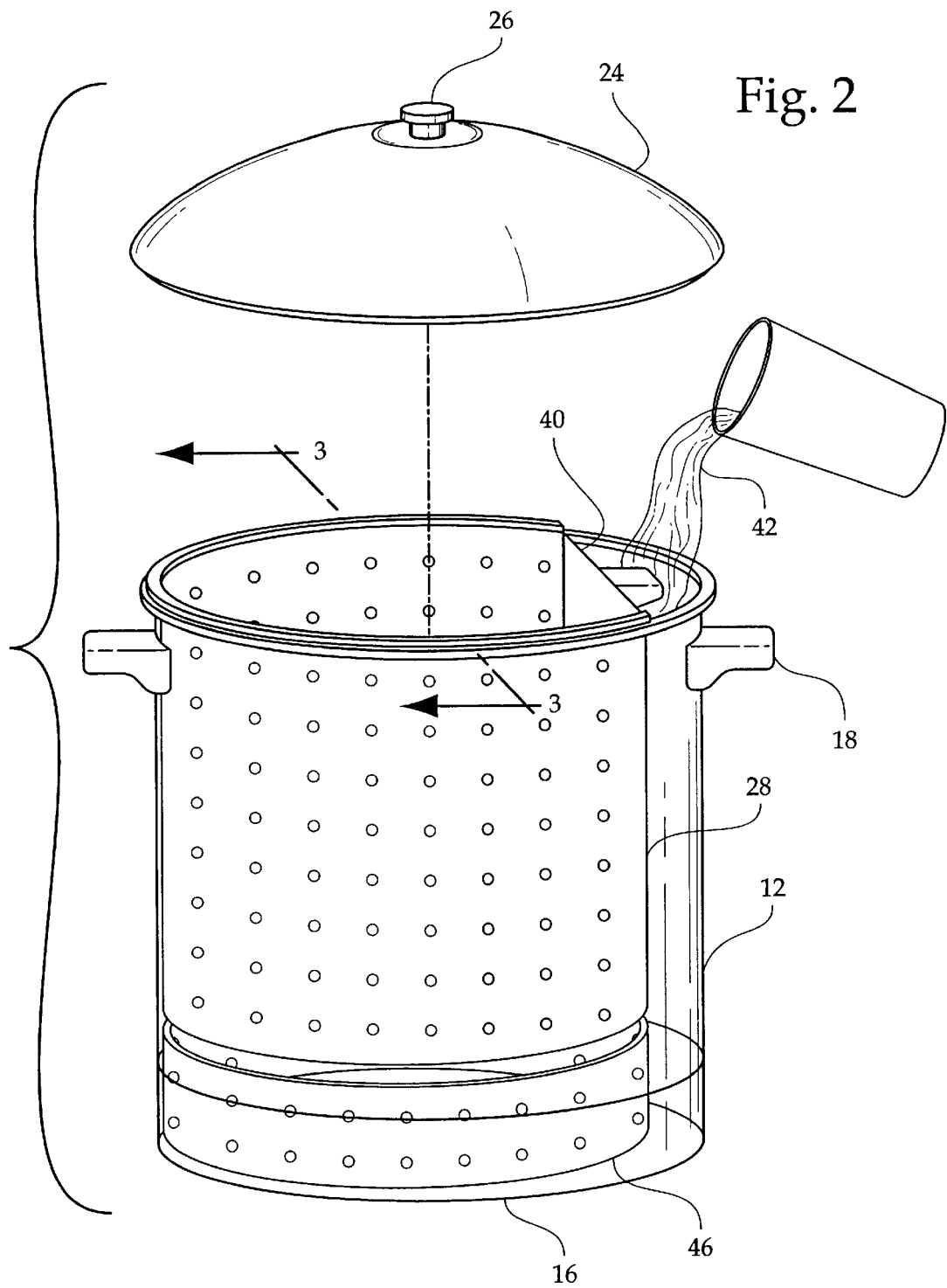
FIG. 2 is a side view of the present invention illustrated in use.
Figure 3:
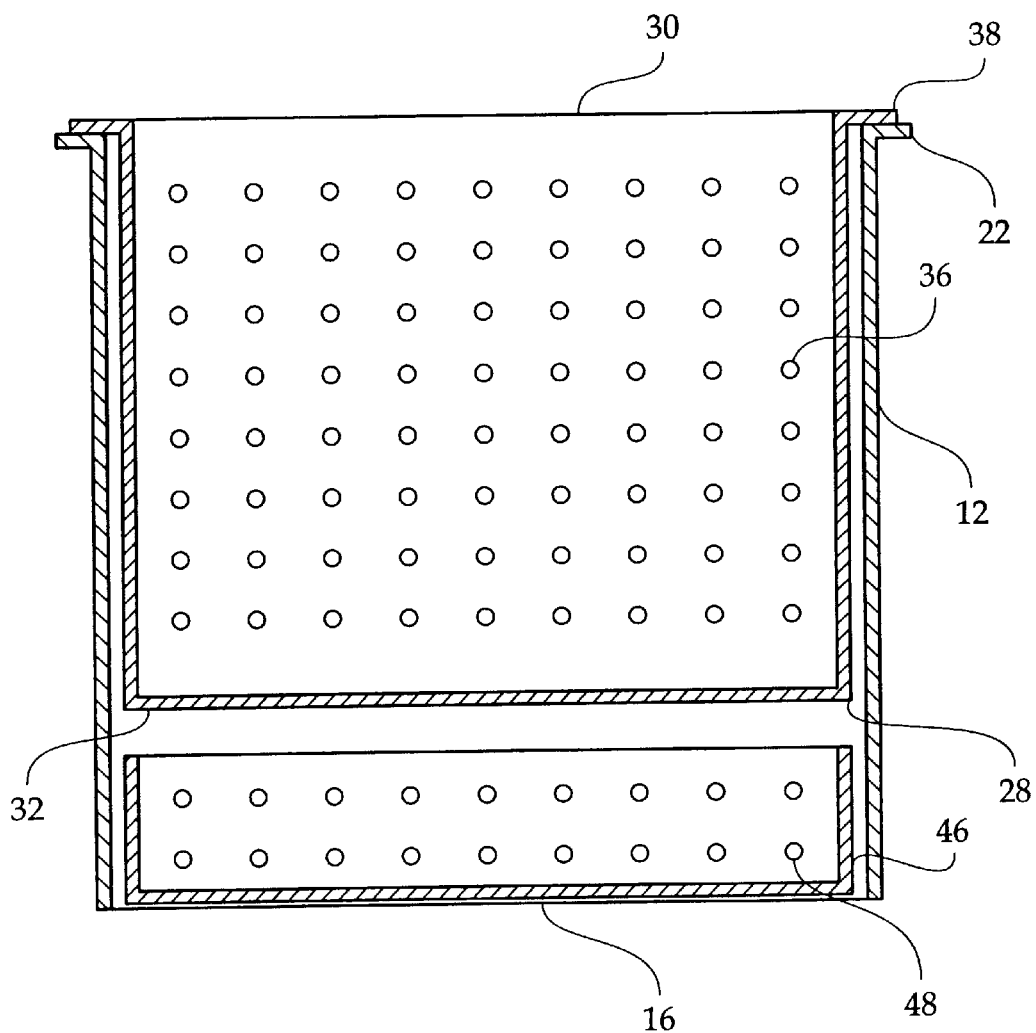
FIG. 3 is a cross-sectional view of the present invention as taken along line 3—3 of FIG. 2.

With reference now to the drawings, and in particular, to FIGS. 1 through 3 thereof, the preferred embodiment of the new and improved tamale and vegetable steaming device embodying the principles and concepts of the present invention and generally designated by the reference number 10 will be described.

Specifically, it will be noted in the various figures that the device relates to tamale and vegetable steaming device for allowing tamales and vegetables to be steamed while easily monitoring water levels to prevent burning. In its broadest context, the device consists of a cylindrical pot portion and a cylindrical insert. Such components are individually configured and correlated with respect to each other so as to attain the desired objective.

The cylindrical pot portion 12 has an open upper end 14 and a closed lower end 16. The cylindrical pot portion 12 is fabricated of a transparent material. Ideally, the pot portion 12 will be fabricated of glass to allow the contents to be easily viewed. The transparent material will also enable one to see if more water is needed. The pot portion 12 has a pair of diametrically opposed handles 18 extending outwardly therefrom downwardly of the open upper end 14. The pot portion 12 has an annular line 20 extending therearound upwardly of the closed lower end 16. The annular line 20 will serve as a fill line for water when added to the pot portion 12. The open upper end 14 has an annular lip 22 extending outwardly therefrom. The pot portion 12 includes a cover portion 24 dimensioned for positioning over the open upper end 12. The cover portion 24 has a handle 26 secured thereto.

The cylindrical insert 28 is positionable within the cylindrical pot portion 12. The cylindrical insert 28 has an open upper end 30, a closed lower end 32, and a cylindrical side wall 34 therebetween. The cylindrical side wall 34 has a plurality of apertures 36 therethrough in a spaced relationship. The open upper end 30 has an annular lip 38 extending outwardly therefrom. The annular lip 38 rests on the annular lip 22 of the pot portion 12 whereby the closed lower end 32 of the insert 28 is elevated above the closed lower end 16 of the pot portion 12. The insert 28 has a flattened arc portion 40 extending a height thereof. The flattened arc portion 40 creates a separation between the insert 28 and the pot portion 12 whereby water 42 can be added to the pot portion 12 through the separation. Note FIG. 2. The flattened arc portion 40 has a handle 44 extending outwardly thereof adjacent to the open upper end 30 of the insert 28. The handle 44 facilitates the removal of the insert 28 from the pot portion 12.

Alternatively, the annular lips 22, 38 can be replaced by an annular ring 46. Note FIGS. 1–3. The annular ring 46 positionable within the pot portion 12 on the closed lower end 16 thereof. The annular ring 46 has apertures 48 therethrough. The annular ring 46 receives the insert 28 therein for elevating the insert 28 with respect to the pot portion 12. Preferably, the annular ring 46 will have a height consistent with the annular line 20 of the pot portion 12.

The transparent material constructing the pot portion 12 allows the water level to be easily monitored without having to remove the lid 24 or move the contents of the pot portion 12. Additionally, the tamales or vegetables that are being cooked can also be easily monitored. When the water level is becoming too low, the lid 24 is simply removed and water is added to the pot portion 12 without removing the insert 28 or pouring over the contents through the use of the separation that is created by the flattened arc portion 40.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tamale and vegetable steaming device for allowing tamales and vegetables to be steamed while easily monitoring water levels to prevent burning comprising, in combination:

a cylindrical pot portion having an open upper end and a closed lower end, the cylindrical pot portion being fabricated of a transparent material, the pot portion having a pair of diametrically opposed handles extending outwardly therefrom downwardly of the open upper end, the pot portion having an annular line extending therearound upwardly of the closed lower end, the open upper end having an annular lip extending outwardly therefrom, the pot portion including a cover portion dimensioned for positioning over the open upper end, the cover portion having a handle secured thereto; and a cylindrical insert positionable within the cylindrical pot portion, the cylindrical insert having an open upper end, a closed lower end, and a cylindrical side wall therebetween, the cylindrical side wall having a plurality of apertures therethrough in a spaced relationship, the open upper end having an annular lip extending outwardly therefrom, the annular lip resting on the annular lip of the pot portion whereby the closed lower end of the insert is elevated above the closed lower end of the pot portion, the insert having a flattened arc portion extending a height thereof, the flattened arc portion creating a separation between the insert and the pot portion whereby water can be added to the pot portion through the separation, the flattened arc portion having a handle extending outwardly thereof adjacent to the open upper end of the insert.

2. A tamale and vegetable steaming device for allowing tamales and vegetables to be steamed while easily monitoring water levels to prevent burning comprising, in combination:

a cylindrical pot portion having an open upper end and a closed lower end; and a cylindrical insert positionable within the cylindrical pot portion, the cylindrical insert having an open upper end, a closed lower end, and a cylindrical side wall therebetween, the cylindrical side wall having a plurality of apertures therethrough in a spaced relationship, the insert being positioned within the pot portion whereby the closed lower end of the insert is elevated above the closed lower end of the pot portion, the insert having a flattened arc portion creating a separation between the insert and the pot portion whereby water can be added to the pot portion through the separation.

3. The tamale and vegetable steaming device as set forth in claim 2, wherein the cylindrical pot portion is fabricated of a transparent material.

4. The tamale and vegetable steaming device as set forth n claim 2, wherein the pot portion has a pair of diamtetrically opposed handles extending outwardly therefrom downwardly of the open upper end.

5. The tamale and vegetable steaming device as set forth in claim 3, wherein the pot portion has an annular line extending therearound upwardly of the closed lower end.

6. The tamale and vegetable steaming device as set forth in claim 2, wherein the pot portion includes a cover portion dimensioned for positioning over the open upper end thereof.

7. The tamale and vegetable steaming device as set forth in claim 6, wherein the cover portion has a handle secured thereto.

8. The tamale and vegetable steaming device as set forth in claim 2, wherein the flattened arc portion has a handle extending outwardly thereof adjacent to the open upper end of the insert.

9. The tamale and vegetable steaming device as set forth in claim 2 and further including an annular ring positionable within the pot portion on the closed lower end thereof, the annular ring having apertures therethrough, the annular ring receiving the insert thereon for elevating the insert with respect to the pot portion.

10. The tamale and vegetable steaming device as set forth in claim 2, wherein the open upper ends of the pot portion and the insert each having an annular lip extending outwardly therefrom, the annular lip of the insert resting on the annular lip of the pot portion whereby the closed lower end of the insert is elevated above the closed lower end of the pot portion.

* * * * *